July 2, 1968 T. L. McAULIFFE Re. 26,419

HEEL FOR ATHLETIC SHOE

Original Filed April 22, 1964

Inventor
Timothy L. McAuliffe
by Morse & Altman
Attys.

United States Patent Office

Re. 26,419
Reissued July 2, 1968

26,419

HEEL FOR ATHLETIC SHOE

Timothy L. McAuliffe, 101 Monmouth St., Brookline, Mass. 02146

Original No. 3,271,885, dated Sept. 13, 1966, Ser. No. 361,715, Apr. 22, 1964. Application for reissue Dec. 30, 1966, Ser. No. 612,748
12 Claims. (Cl. 36—2.5)

Matter enclosed in heavy brackets [ ] appears in the original patent but forms no part of this reissue specification; matter printed in italics indicates the additions made by reissue.

*ABSTRACT OF THE DISCLOSURE*

*A heel piece of synthetic resin material, preferably circular, replaces the customary two cleats on the heel of a football shoe. The heel piece has two aligned slots to receive the threaded studs on which the heel cleats are customarily mounted.*

This invention relates to a heel for an athletic shoe and more particularly to a heel for a football shoe. Football shoes as now used are customarily provided with frusto-conical cleats on the soles and heel to minimize slipping on turf. The customary provision for the heel of a football shoe is two cleats mounted side by side on a line transverse to the long axis of the shoe. It has been found that this arrangement presents a hazard to the player when dodging in broken-field running since such running usually involves sharp pivoting on the heel which may be resisted by the heel cleats sufficiently to cause ankle sprain. It is an object of this invention to provide a heel piece for a football shoe which will furnish adequate traction on turf, permit ready pivoting of the player on his heel, be relatively mud-free, and be readily attachable to the heel portion of the sole of the customary football shoe. For this purpose a disk of slightly resilient material such as polyurethane is shaped as hereinafter described and is provided with two elongated apertures to receive the threaded studs which are customarily mounted on the heel of the shoe to hold frusto-conical cleats. A shoe having the usual two heel cleats can thus be quickly and easily altered to be equipped with a circular heel as hereinafter described.

For a more complete understanding of the invention, reference may be had to the following description thereof and to the drawing, of which—

Figure 3:
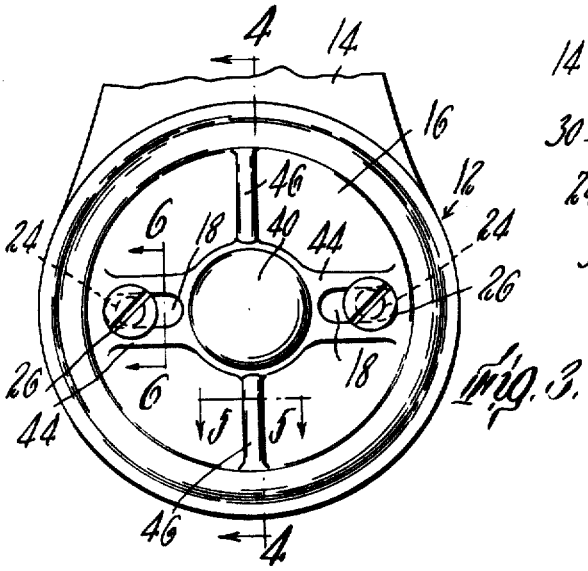
FIGURE 3 is a bottom plan view of the heel piece shown in FIGURE 2, on a shoe sole.
Figure 5:
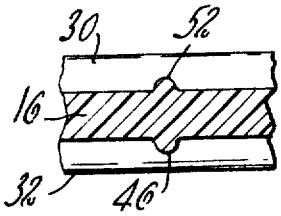
Figure 4:
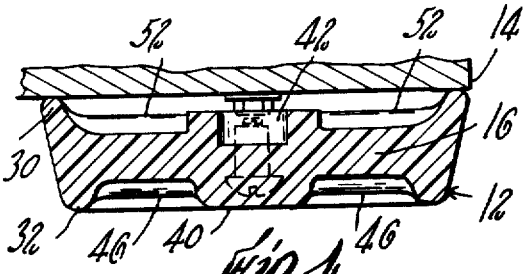
Figure 6:
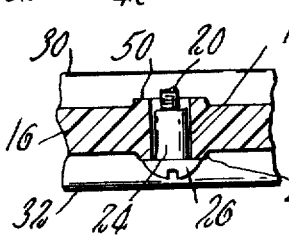
Figure 7:
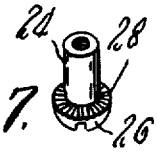

FIGURES 4, 5 and 6 are sections on the lines 4—4, 5—5 and 6—6 of FIGURE 3; and FIGURE 7 is a perspective view of a female screw with a knurled shoulder.

Figure 1:
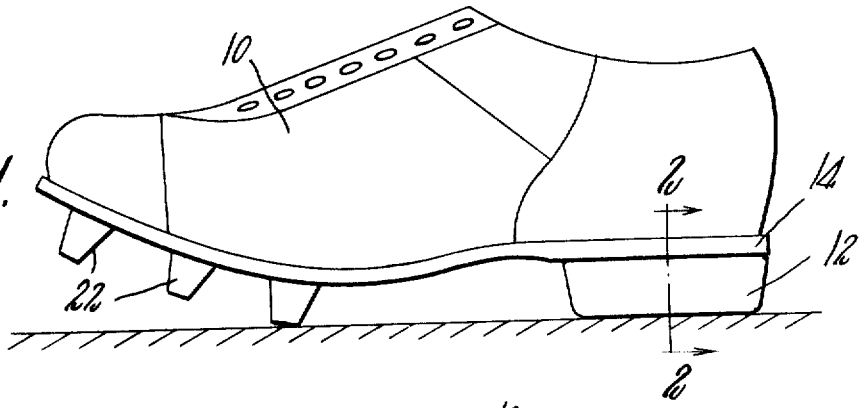
FIGURE 1 is a side elevation of a football shoe having a heel piece which is an embodiment of the invention.

A standard football shoe 10 is shown in FIGURE 1 with a heel piece 12 secured to the heel portion of the outsole 14. The heel piece 12 is a single member of molded synthetic material such as polyurethane which is a somewhat rubbery composition characterized by a slight resilience instead of the rigidity which is possessed by many of the synthetic resins.

The heel piece 12 comprises a circular disk 16 of substantial thickness having apertures 18 to receive the threaded studs 20, two of which are customarily mounted on the heel portion 14 of the outsole to support cleats of the type indicated at 22 in FIGURE 1. In order to be mountable on shoes having different spacing between the two studs 20, the apertures 18 are preferably in the form of radially extending slots as indicated in FIGURE 3. To secure the heel piece 12 to the sole, female screws 24 having round heads 26 with knurled shoulders 28 extend into the slots 18 from the bottom of the heel piece and are in threaded engagement with the respective studs 20. The heads 26 are wider than the slots so that the knurled shoulders 28 bear on the bottom surface of the heel piece, the knurling serving to lock the screws 24 against accidental loosening.

Figure 2:
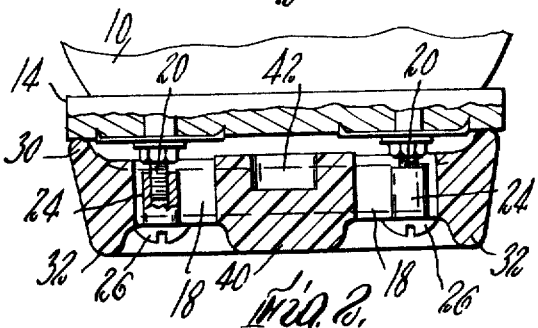
FIGURE 2 is an enlarged section on the line 2—2 of FIGURE 1.

The upper face of the disk 16 has a circumferential flange 30 rising therefrom with a rounded sectional contour as indicated in FIGURES 2 and 4. This flange presses resiliently against the sole of the shoe. A somewhat similar circumferential flange 32 with a rounded sectional contour extends down from the lower face of the disk 16 to engage the ground when the shoe is being worn. This provides traction and minimizes side-slip of the heel on the ground, but permits turning of the foot about the heel as a pivot. A central boss 40 on the bottom face of the disk has a height about equal to that of the flange 32, a central recess 42 being provided in the upper face of the disk opposite the boss 40. The recess 42 reduces the weight of the heel piece 10 and adds to the yielding of the central portion of the disk when it is pressed upward by engagement of the boss 40 with the ground. The resultant slight distortions of the disk help to prevent mud or dirt from clinging to the bottom of the disk. To stiffen the disk as a whole, radial ribs are formed on one or both faces of the disk. As shown, four such ribs are on the bottom of the disk, two of these ribs 44 being wide enough to flank the slots 18, the other two ribs 46 on this face being in a line at right angles to the line of the ribs 44. The height of the ribs 44, 46 is preferably about half that of the flange 32. The slots 18 divide each of the ribs 44 into two narrow ridges on which the shoulders of the corresponding screw 24 presses. As the material of the disk and its ribs can yield to some extent, the pressure of the shoulders of the screws 24 on the ridges tends to close the slots 18 somewhat, making the slots less receptive to the entry of mud thereinto.

Ribs 50 and 52, similar respectively to ribs 44 and 46, are radially arranged on the top face of the disk 16. The height of these ribs is preferably about half that of the flange 30.

The two cleats customarily provided on the heel portion of football shoes as now generally made can quickly and easily be removed and replaced by a circular heel piece as described, the result being a substantially improved shoe.

I claim:

1. A heel piece for a football shoe comprising a substantially planar circular disk of a slightly resilient substance having apertures therethrough for the reception of fastening elements, a circular flange projecting up from the circumference of the upper face of said disk, and a circular flange projecting down from the circumference of the bottom face of said disk, said flanges being integral with the disk, said apertures being aligned radial slots.

2. A heel piece as described in claim 1, said disk having a central boss on its bottom face and a central recess in its top face.

3. A heel piece as described in claim 1, said disk having a plurality of radially extending ribs on the bottom face thereof.

4. A heel piece as described in claim 3, said ribs being about half the height of the flange surrounding the bottom face.

5. A heel piece as described in claim 3, said disk also having a plurality of radially extending ribs on the top face thereof.

6. A heel piece as described in claim 5, said ribs being about half the height of the flanges surrounding said faces.

7. A heel piece as described in claim 6, two of the ribs on each of said faces flanking said radial slots.

8. A heel piece as described in claim 6, said flanges and ribs having rounded sectional contours.

9. A heel piece as described in claim 8, said piece being composed of polyurethane.

10. A football shoe having an outsole with two threaded studs projecting from the heel portion thereof, and a heel piece secured against said heel portion of the sole, said heel piece comprising a circular disk of polyurethane having apertures therethrough into which said studs project, a raised circumferential flange on the upper face of said disk bearing against said sole, a circumferential flange extending down from the lower face of said disk, and a female screw in threaded engagement with each said stud, each said screw having a head with a knurled shoulder bearing on the under surface of said piece.

*11. A heel piece of a synthetic resin material for a football shoe adapted to replace the two customary cleats on the heel portion of the shoe, said heel piece having two aligned slots therethrough adapted to receive the*

*threaded studs on which heel cleats are customarily mounted.*

*12. A football shoe having two spaced threaded studs projecting from the heel portion thereof, a heel piece of a synthetic resin material attached to said heel portion of the shoe, said heel piece having two aligned slots through which said studs extends, and headed female screws extending into said slots in threaded engagement with said studs, the heads of said screws being wider than the slots and bearing against the bottom surface of said heel piece to press said heel piece against the heel portion of the shoe.*

References Cited

The following references, cited by the Examiner, are of record in the patented file of this patent or the original patent.

UNITED STATES PATENTS

| | | | |
|---|---|---|---|
| 1,072,794 | 9/1913 | Tradesco | 36—2.5 |
| 2,261,785 | 11/1941 | Youmans | 36—59 |
| 2,677,905 | 5/1954 | Dye | 36—59 |
| 2,678,507 | 5/1954 | Dye | 36—59 |

PATRICK D. LAWSON, *Primary Examiner.*